No. 840,260. PATENTED JAN. 1, 1907.
P. SCHNEIDER.
MACHINE FOR LAYING OFF PATTERNS ON AND OTHERWISE PREPARING BOARDS FOR THE MANUFACTURE OF PIANO AND ORGAN KEYS.
APPLICATION FILED APR. 28, 1906.

Witnesses:
Chas. E. Gorton
M. A. Nyman Inventor:
Philipp Schneider
By Chas. C. Tillman
Atty.

UNITED STATES PATENT OFFICE.

PHILIP SCHNEIDER, OF CHICAGO, ILLINOIS.

MACHINE FOR LAYING OFF PATTERNS ON AND OTHERWISE PREPARING BOARDS FOR THE MANUFACTURE OF PIANO AND ORGAN KEYS.

No. 840,260. Specification of Letters Patent. Patented Jan. 1, 1907.

Application filed April 28, 1906. Serial No. 314,236.

*To all whom it may concern:*

Be it known that I, PHILIP SCHNEIDER, a subject of the Emperor of Austria-Hungary, residing at Chicago, in the county of Cook and State of Illinois, have invented certain new and useful Improvements in a Machine for Laying Off Patterns on and Otherwise Preparing Boards for the Manufacture of Piano and Organ Keys, of which the following is a specification.

As is well known to those skilled in the art to which my invention pertains, convenience of manufacture and perfection of result require that keys for pianos and analogous instruments shall be made from material which is first produced in the form of a broad continuous board and that such boards of even-grained and well-seasoned material must be marked off so that the principal dividing-lines and lines for the cross-cuts at the end of the short levers or sharps may be indicated for the guidance of the workmen in dividing the boards and cutting the ends of the short levers.

In an application, Serial No. 286,001, for Letters Patent filed by me on the 6th day of November, 1905, I have shown and described certain improvements in machines for laying off patterns on boards for the manufacture of piano and organ keys which is somewhat similar in its construction to that of my present invention, which will be hereinafter described, and the objects of the two inventions are substantially the same—namely, to provide a plotting or pattern-making machine for the above-named purpose which shall be so made as to mark the boards so as to indicate where they are to be sawed to form the keys, the points for boring the same for the pins on the balance-rail, as well as for the guide-pins near and in the heads of the keys, and also for marking and cutting slits for strips.

Another object of the invention is to so construct the machine that certain parts thereof may be adjustable in order to place indicating-marks on the boards in such a manner as to form the inner portion of the keys when desired at the proper slant or slants or lateral inclination with respect to the outer portions thereof and to vary the location of the bores or holes for the balance-pins.

Additional objects of the present invention are to increase or double the capacity of the machine for turning out its work and to provide means for finishing the edges of the boards out of which the keys are to be formed during the operation of marking the same, to furnish adjustable means for holding boards of different thicknesses on the supporting-frame, to provide means for marking off that portion of the boards which will form the inner parts of the keys, so that said portions may be formed with one or more slants and enlargements.

Numerous other objects and advantages of the invention will be disclosed in the subjoined description and explanation.

The invention consists in certain peculiarities of the construction, novel arrangement, and operation of the various parts thereof, as will be hereinafter more fully set forth and specifically claimed.

In the accompanying drawings, Fig. 17 is a greatly-enlarged plan view of a portion of one of the inner adjustable bars, showing the pin thereof for marking the balancing-bore in position. Fig. 18 is a central sectional view thereof.

Like numerals of reference refer to corresponding parts throughout the different views of the drawings.

Figure 1:
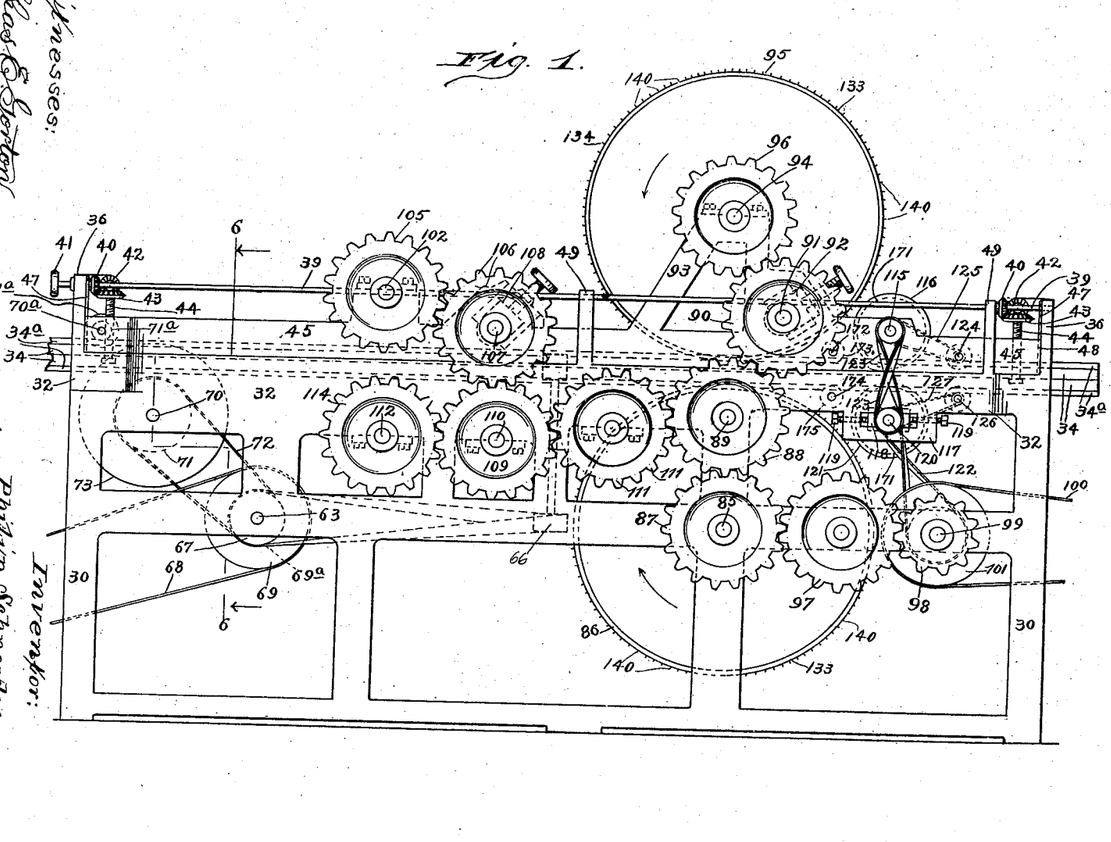
Figure 1 is a side view in elevation of a machine embodying the invention, showing the parts in position ready for use and illustrating two boards out of which the keys are to be formed in place and being acted upon by the different elements of the machine.
Figure 2:
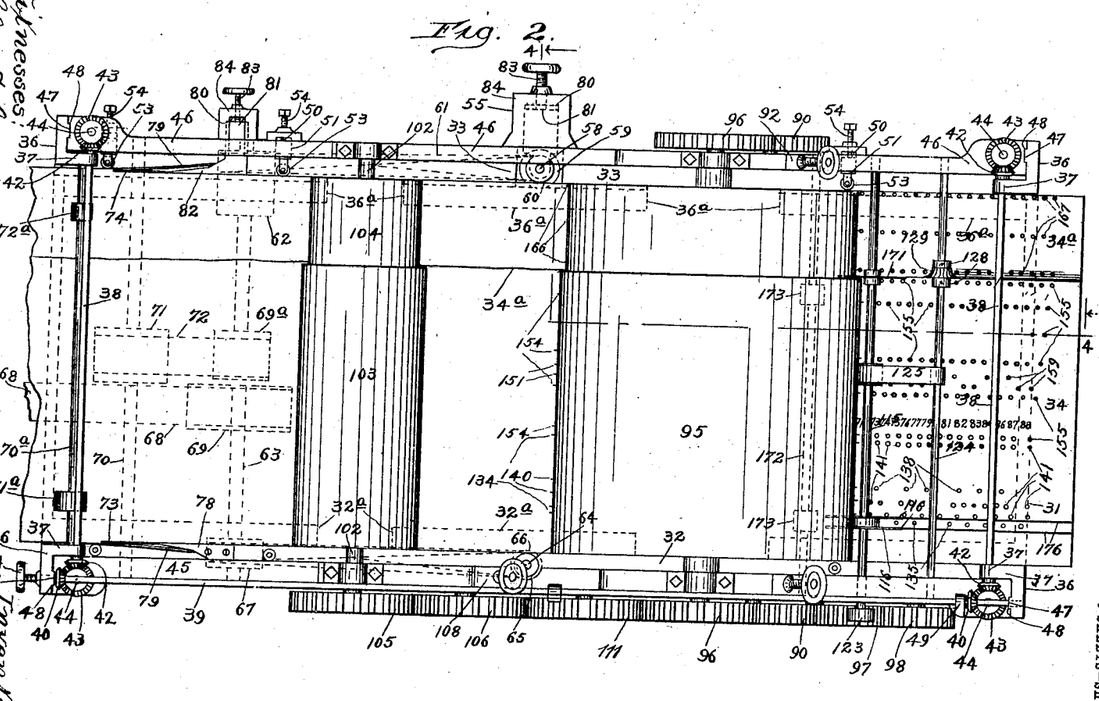
Fig. 2 is a plan view thereof.
Figures 3, 4, 5, 6, 8:
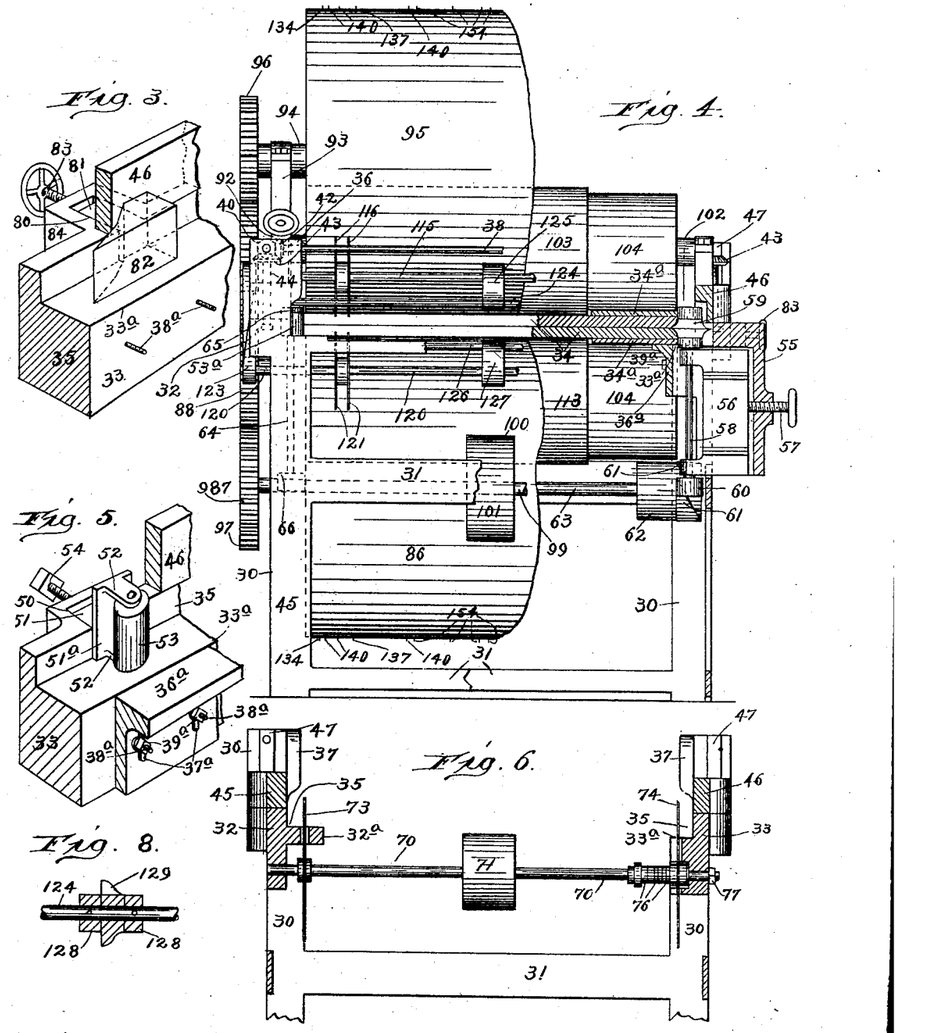
Fig. 3 is an enlarged perspective view of a portion of one side of the supporting-frame, showing a part of one of the movable rails thereon and an adjustable knife or cutter for breaking off the strips sawed from the edges of the boards.
Fig. 4 is a rear end view, partly in elevation and partly in section, taken on line 4 4 of Fig. 2 looking in the direction indicated by the arrows.
Fig. 5 is an enlarged perspective view of a portion of one side of the supporting-frame and one of the movable rails thereon, showing one of the adjustable antifriction-rollers carried by the former.
Fig. 6 is a cross-sectional view of a portion of the supporting-frame, taken on line 6 6 of Fig. 1 looking in the direction indicated by the arrows, showing the saws used for trimming the edges of the boards mounted thereon.
Fig. 8 is a detail view, partly in section, of one of the cutters used for edging the enlargements on the inner portion of the keys.
Figure 7:
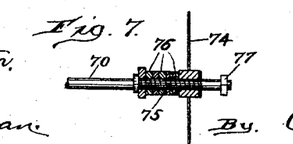
Fig. 7 is a detail view, partly in section and partly in elevation, showing the manner of adjustably mounting one of said saws on its shaft.

The sides of the main or supporting frame of the machine, which frame may be of any suitable size, form, and material, but preferably rectangular in shape, as shown in Figs. 1, 2, and 4 of the drawings, are designated by the reference-numerals 30 and are united by cross-pieces 31 at or near each of their ends. One of the sides 30 of the frame has at its upper portion a horizontally and longitudinally extending rail 32 and the other side a similarly-disposed rail 33 and, as shown in Figs. 4 and 6, extend inwardly or toward each other, so as to form ledges for supporting the boards 34 out of which the keys are to be formed. The upper inner portion of the rail 33 is formed with a recess 35 for the purpose to be presently explained. Each of the rails 32 and 33 is provided at each of its ends with an upwardly-extending standard 36, and each of said standards is provided with an inturned apertured arm 37 to support and form bearings for shafts 38, which are journaled in said arms and extend across the top of the frame near each of its ends. Longitudinally journaled on the upper portion of the standard 36 on the rail 32 is a shaft 39, which has near each of its ends a beveled gear 40 and at one of its ends a hand-wheel 41 to be used for turning said shaft. Each of the shafts 38 is provided at each of its ends with a beveled gear 42 to engage beveled gears 43 on the upper ends of screw-rods 44, one of which is vertically located near each end of each of the rails 32 and 33 and pass through vertical openings in the adjustable or movable rails 45 and 46, which lie longitudinally and normally on the rails 32 and 33, respectively. Each of the rails 45 and 46, which form a part of the main frame, is guided in its vertical movement by means of tongues 47 and grooves 48 on the inner surfaces of the uprights 36 and in the ends of the said rails, respectively.

The rail 32 is provided with a number of upwardly and inwardly extending brackets 49 between its ends, on which the shaft 39 is also journaled. The rail 33 is formed in its upper portion with a number of recesses 50, in each of which is located a movable block 51, which is provided on its inner end with a plate 51ª, having prongs 52, (see Fig. 5,) between which is vertically journaled an anti-friction-roller 53. Each of these blocks is adjustably held in position by means of screw-bolts 54, which pass horizontally through the rail 33, as is clearly shown in Figs. 2 and 5 of the drawings. The rail 46, as well as the rail 33 thereunder, is provided at about its middle with an inwardly-recessed portion and the latter with an outwardly-extending bracket or portion 55, in which is vertically located a block 56, Fig. 4, which is adjustably held in position by means of a screw-rod 57 passing through the portion 55 and engaging said block. Vertically journaled on the inner portion of the block 56 is a shaft 58, which carries on its upper end a circular cutter 59, which is enlarged at its middle and is used for beveling or curving one edge of the boards. The lower end of the shaft 58 has mounted thereon a pulley 60, around which a belt 61 is passed, which also passes around a pulley 62, mounted on a shaft 63, transversely journaled on the sides of the main frame near its middle. Directly opposite the shaft 58 is vertically journaled on the side 30 of the frame another shaft 64, on the upper end of which is mounted a circular cutter 65 to act on or plane the opposite edges of the boards.

The lower end of the shaft 64 has mounted thereon a pulley 66, which is geared, by means of a belt, to another pulley 67 on the shaft 63 near its end opposite that on which the pulley 62 is mounted. Thus it will be understood that the vertical shafts 58 and 64 at the sides of the supporting-frame are driven by the shaft 63, to which power may be applied from a suitable source by means of a belt 68 passing over a pulley 69 on said shaft. Transversely journaled on the lower portion of the rails 32 and 33 near their front ends is a shaft 70, on which is mounted a pulley 71, which is geared to the pulley 69ª by means of a belt 72, thus transmitting power from the shaft 63 to the shaft 70, on which are mounted, near the side rails 32 and 33, circular saws 73 and 74, respectively. The saw 73 is preferably rigidly mounted on the shaft 70, while the saw 74 is adjustably mounted thereon, and for this purpose a portion of the shaft 70 is screw-threaded, as at 75, and has mounted on said portion a number of collars 76, Fig. 6, as well as the hub of the saw 74, so that when it is desired to shift the position of said saw—that is, inwardly or outwardly—so as to saw the boards in different widths it may be done by removing the saw from the shaft and removing or placing thereon one or more of the collars, after which the saw may be replaced on the shaft and held in position by means of a nut 77 engaging the outer screw-threaded portion of said shaft. The saws 73 and 74 are employed to cut the rough edges from the boards 34 and to saw it to the proper width, so as to furnish keys of the desired length, which are formed transversely with respect to said boards. Transversely journaled in front of the shaft 70 on the front portion of the movable rails 45 and 46 is a shaft 70ª, on which are mounted near its ends rollers 71ª and 72ª, employed to hold the boards 34 and their enlarging strips, when the latter is used, in contact with the said saws.

A short distance to the rear of the saw 73 the rail 32 has mounted on its upper surface a wedge-shaped knife 78, which is designed to cause the strip of wood or shaving 79 to be pressed outwardly from the saw and to be broken off, as it will be understood by reference to Fig. 2 of the drawings. The rail 33 is provided at a point at the rear of the saw 74 with a horizontal recess 80, in which is movably mounted a block 81, on the inner portion of which is secured a knife or chisel 82, which is for the same purpose as the knife 78 and is located directly behind the saw 74 and may be adjusted by means of a screw-rod 83, which passes through a bracket 84 on the outer surface of the rail 33 at its recess 80, which screw-rod engages the movable block 81, which carries the knife 82, so that it may be moved inwardly or outwardly, as desired, to operate on a narrow or wider board. Transversely journaled in the sides of the machine near their middle, but in their lower portion, is a shaft 85, on which is mounted the lower marking-roller 86, which may be made of any desired material. The shaft 85 by preference has on each of its ends a gear 87, which meshes with gears 88, mounted on shafts 89, journaled on the sides of the frame above the shaft 85, which latter gears mesh with gears 90, one of which is by preference journaled on shafts 91, adjustably mounted, by means of a sliding box 92, on an upwardly-extending bracket 93, secured to the rails 45 and 46 near their middle portions. Transversely journaled on the upper portion of the brackets 93 is a shaft 94, on which the upper marking-roller 95 is mounted. This shaft by preference has on each of its ends a gear 96 to mesh with the gears 90, so as to impart motion to the upper marking-roller.

The gears 87 on the shaft 85 also mesh with gears 97, journaled on each side of the frame, which in turn mesh with gears 98 on the driving-shaft 99, which is transversely journaled on the rear portion of the frame and may be driven by means of power applied to it through a belt 100 passing over a pulley 101 on the driving-shaft, thus imparting rotary motion to the lower and upper marking-rollers 86 and 95, respectively, through the instrumentality of the chain of gears just above mentioned. It is evident that said gears on one side of the frame may be omitted; but I prefer to use them on both sides in order to attain a more uniform pressure of the marking-rollers on the boards as they pass between the same. Transversely journaled on the upper front portion of the rails 45 and 46, at the rear of the saws 73 and 74, but in front of the marking-rollers, is a shaft 102, on which is mounted the upper compression or feed roller 103, which is formed with a reduced portion 104, extending from one of its ends inwardly a suitable distance. Mounted on one end of the shaft 102 is a gear 105, which is in mesh with an idle gear 106 on a shaft 107, journaled in a sliding box 108 on the upper portion of the rail 45. The idler 106 meshes with another gear 109 on a shaft 110, journaled below the shaft 107, which latter gear also meshes with a gear 111, journaled between the shafts 110 and 89, which in its turn meshes with the gear 88, as is clearly shown in Fig. 1 of the drawings. Transversely journaled on the sides of the frame directly below the shaft 102 is a shaft 112, on which is mounted the lower compression or feed roller 113, which is of similar construction and the same size as the roller 103, and for this reason it is not deemed necessary to show the lower roller in detail. Mounted on one end of the shaft 112 and engaging the gear 109 is a gear 114, which completes the chain of gearing for operating the feed-rollers 103 and 113, which are located sufficiently far enough apart to permit the boards 34 to pass between them.

It will be noted that the rails 45 and 46 carry the shafts 70ª, 91, 94, 102, and 107 and that the other shafts are journaled on the stationary part of the frame. As the thicknesses of the boards 34, which are laid one on the other, as shown, will vary slightly, it becomes necessary that one of the feed-rollers and one of the marking-rollers shall be adjustably mounted, and it is for this reason that the rails 45 and 46 are provided with means for raising and lowering them in a slight degree, which is done by turning the shaft 39 by means of the hand-wheel 41, which operation will, through the beveled gears 40 and 42 on the shafts 39 and 38, respectively, and the gears 43 on the screw-rods 44, cause the rails to be slightly raised or lowered, as desired. The necessary movement of these rails is but slight, and the arrangement of the gears 40, 42, and 43 will permit it; but in said movement the gears 90 and 106 would also be moved, and for this reason their shafts 91 and 107 are journaled in the adjustable or sliding boxes 92 and 108, so that they may be properly adjusted to hold them in mesh with their intermeshing gears. Transversely journaled on the upper portion of the rails 45 and 46 at a distance to the rear of the marking-rollers is a shaft 115, on which is mounted near the rail 45 and at a slight distance apart two circular saws 116, used for cutting the slits in the upper surface of the upper board. Directly under the shaft 115 each of the rails 32 and 33 is provided with a hanger 117, in each of which is located a sliding journal-box 118, which can be moved within the bracket by means of screw-bolts 119, which pass through the ends of the bracket and engage said journal-box.

Transversely journaled in said journal-boxes and extending across the frame is a shaft 120, on which are mounted directly beneath the saws 116 two circular saws 121, which are employed to form the parallel slits in the lower surface of the lower board. The shaft 120 is driven by means of a belt 122, which passes over pulleys on said shaft and the driving-shaft 99, as will be readily understood by reference to Fig. 1 of the drawings. The shaft 115 is geared to the shaft 120 by means of a belt 123 and is thereby driven. Transversely journaled on the rails 45 and 46, at the rear of the shaft 115, is a shaft 124, which is geared to the shaft 115 by means of a belt 125. Directly below the shaft 124 another shaft 126 is transversely journaled on the rails 32 and 33 and is driven by means of a belt 127, connecting said shaft to the shaft 120. Adjustably mounted on each of the shafts 124 and 126, at a suitable point near the rails 33 and 46 by means of sliding collars 128, is a cutter 129, which is interposed between said collars and is employed to finish or form a suitable edge on the enlarged inner portion of the boards when it is desired to provide the same with such enlargements. Vertically journaled at suitable distances apart on the inner surface of the rail 32 are a series of antifriction-rollers 53$^a$, which are employed in conjunction with the rollers 53 on the opposite side of the frame to facilitate the passage of the boards 34 and to guide them in their passage along the upper portion of the main frame.

Figures 13, 14, 15, 16, 22, 23, 24:
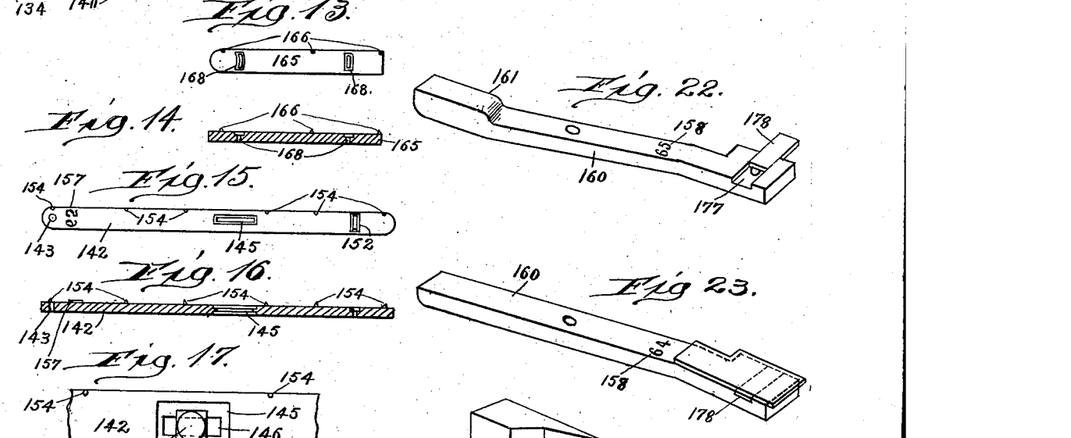
Fig. 13 is an enlarged plan view of the outer one of said bars.
Fig. 14 is a longitudinal sectional view thereof.
Fig. 15 is an enlarged plan view of one of the inner adjustable bars.
Fig. 16 is a longitudinal sectional view thereof.
Figs. 22 and 23 are perspective views of completed piano-keys, the former showing a portion of the protecting-strip for the ivory covering, which strip is partly removed from its recess, and also its inner portion enlarged and the latter showing the ivory covering in position.
Fig. 24 is a detached perspective view of one of the adjustable cutters used for trimming or planing the side edges of the boards.
Figure 19:
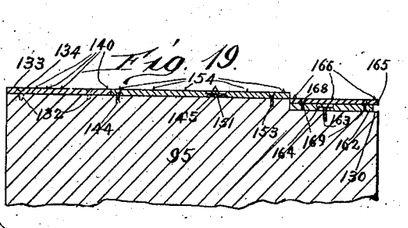
Fig. 19 is a fragmental view of one of the marking-rollers, showing in section the marking-band and adjustable bars secured thereon.
Figure 20:
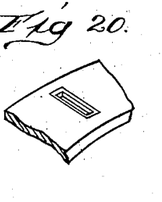
Fig. 20 is a perspective view of a portion of a filling-band for one of the marking-rollers.
Figure 21:
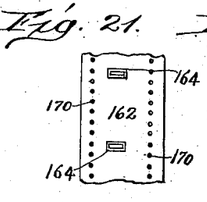
Fig. 21 is a plan view of a portion of one of the bands for the marking-rollers to which the outer adjustable bars are secured.

The upper feed-roller 103 and lower feed-roller 113 are of the same construction and preferably the same size, and the same may be said of the upper marking-roller 95 and the lower one 86, and by reference to Figs. 2, 4, and 19 of the drawings it will be seen and understood that each of the feed-rollers has a reduced portion 104 and that each of the marking-rollers has a reduced portion 130 to permit of the reception and passage of strips 34$^a$, secured to the boards 34 by means of glue or otherwise, on the upper surface of one of said boards and on the lower surface of the other when it is desired to form the keys with enlargements on their inner portions, as shown in Fig. 22, by which is meant that portion of the keys which extends within the piano-casing and engages the action of the instrument. If it is desired to produce keys of the same thickness throughout its entire length, as shown in Fig. 23, the reduced portions 104 in the feed-rollers and the like portion 130 in the marking-rollers may be filled, so as to be flush with the enlarged portion of said rollers, by means of a filling-band 131, (see Fig. 20) of any suitable material, which may be secured circumferentially around said reduced portions in any desired manner.

Figure 9:
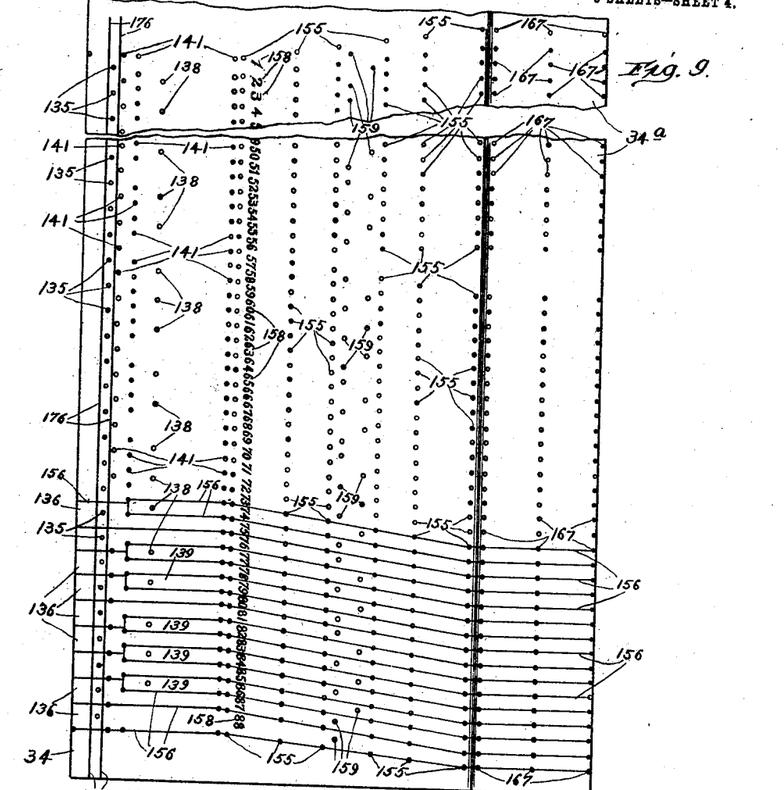
Fig. 9 is a plan view of one of the boards after it has been passed through the machine, showing it shortened for the convenience of illustration and the indicating-marks thereon for sawing out and boring a complete set of keys and illustrating slits formed longitudinally in the board near one of its edges.
Figure 10:
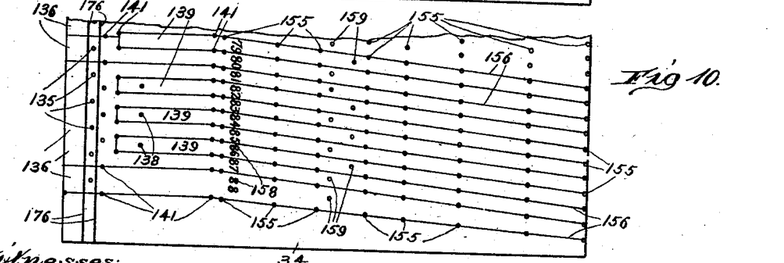
Fig. 10 is a similar view of a portion of one of the boards, showing a modification of the patterns and by lines connecting the dots the keys sawed out.
Figures 11, 12:
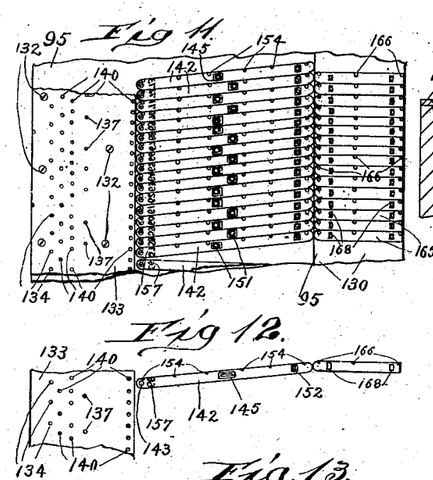
Fig. 11 is a view of a portion of one of the marking-rollers, showing the means for producing the patterns on the boards mounted thereon.
Fig. 12 is a plan view of a portion of the marking-band and two adjustable bars, which carry pins or projections for marking certain portions of the boards, showing them detached from the marking-roller.

Rigidly secured to the periphery of each of the marking-rollers by means of screws 132 (see Fig. 11) or otherwise is a marking-band 133, which by preference entirely surrounds said roller and extends from one of its ends inwardly thereon to a sufficient distance to produce marks or patterns for forming the heads or outer portions of the keys, which when in place on the piano are exposed or outside of the piano-casing. The band 133 is provided on its outer surface with a series of pointed pins 134, arranged in a row circumferentially around the band near its outer edge to produce marks or indentations 135, Figs. 9 and 10, to indicate where the heads of the natural keys 136 are to be bored for the reception of the guide-pins therefor, and said band is also provided with a series of pointed pins 137 in a circumferential row around the band to produce marks or indentations 138 to indicate the points at which the sharps and flats 139 are to be bored for the reception of the guide-pins therefor. The band 133 is also provided with a series of pointed pins 140, arranged in transverse rows across the band to form marks or indentations 141 on the board 34 to indicate the lines on which the same is to be sawed in order to form the heads of the natural keys 136 and of the sharps and flats.

Pivotally secured to the roller near the inner edge of the band 133 are a series of adjustable bars 142, which extend at their opposite ends to the edge of the enlarged portion of the roller adjacent to its reduced portion. Each of the bars 142 has its end adjacent to the band 133 rounded and provided with an opening 143 to receive a screw 144, used for securing it at said end in place on the roller. Each of the bars is provided at about its middle with an elongated opening 145 therein, which opening has at about the middle of its perimeter an inwardly-extending ledge 146, which provides an upper and lower countersunk opening 147 and 148, respectively, on the movable pin 151, one of which is located in each of the openings 145 of each of the adjustable bars, each of which has near its other end a transverse slot 152 to receive a securing pin or screw 153, which passes through said slots and engages the roller. Each of the bars 142 has near one of its edges a series of pins 154, employed to form marks or indentations 155, arranged in transverse rows on the board 34 to indicate the lines on which it is to be sawed to produce the inner portion of the key, or that portion thereof which lies within the piano-casing, the kerfs of the saw being indicated by the lines 156 in Figs. 9 and 10 of the drawings. Each of the bars 142 is also provided on its outer surface with dies 157 to produce numbers 158, running numerically from "1" to "88," or to represent the number of keys to be made for the instrument. The pins 151 are adjustably located in the openings 145 by means of the flanges 149 and nut 150 and are employed to produce the marks or indentations 159 in the board 34 for the reception of the pins on the balance-rail.

By pivotally securing the bars 142 at one of their ends to the roller it is evident that said bars may be arranged at the proper slant or inclination to the edge of the band 133, so that the board 34 will be marked by means of the pins on said bars in such a manner that the inner portion of the keys may be formed at the desired slant or inclination or in alinement with their outer portions, for it will be understood that in some instruments some of the keys are more or less inclined at their inner portions and in other instruments some of the keys are straight, while others are inclined.

As before stated, it is sometimes desirable to provide the keys 160 with an enlargement 161 on their inner portions, as shown in Fig. 22 of the drawings, and it is for this reason the feed-rollers and marking-rollers are provided with correspondingly-reduced portions 104 and 130 at one of their ends, so as to permit the boards, which may have strips 34ª glued or secured thereto, to pass between said rollers, and in order to mark said enlarged portions of the boards a band 162 is secured circumferentially on the reduced portion of each of the marking-rollers by means of screws 163, which pass through transversely-elongated openings 164, which will permit of the lateral adjustment of the band 162 on the reduced portion of each of the rollers. Pivotally secured at their inner ends to the band 162 near its inner edge are a series of adjustable bars 165, each of which is provided at one of its edges with pointed pins 166, employed to form indentations or marks 167, arranged in transverse rows on the board to indicate the lines on which it is to be sawed to produce the inner or enlarged portion of the key, the kerfs of the saw being indicated by the lines 156 in Figs. 9 and 10 of the drawings. Each of the bars 165 is provided with transverse and slightly-curved openings 168 to receive screws 169, which engage openings 170 in the band 162 therefor. By providing the bars 165 with the transverse openings 168 it is apparent that they may be turned on their pivots so as to give the enlarged portion 161 of the keys a different inclination when desired from that marked off by the adjustable bars 142, which, as shown, are located between the inner edge of the band 133 and the inner edge of the band 162 on the reduced portions of the marking-rollers.

As shown in Figs. 4, 5, and 6 of the drawings, the rails 32 and 33 have on their inner surfaces longitudinally-extending recesses 35, produced on the rail 32 by means of a horizontal and inwardly-extending rib or cleat 32ª and on the rail 33 by means of an inwardly-extending portion 33ª, to the inner surface of which is adjustably secured a supporting-plate 36ª, which is provided with a number of slots 37ª to receive bolts 38ª, which are secured to the rail 33 and extend through said slots, the said plate being held in position by means of nuts 39ª, engaging said bolts. This adjustable plate is employed so that it may be raised on the rail 33 to support the boards 34 when keys are to be made without the enlargements 161 on their inner ends and to be lowered on said rail when keys are to be made with such enlargements, thus in the latter case permitting the strips 34ª on the boards 34 to be properly supported.

On each of the shafts 115 and 120, at the rear of the marking-rollers and directly in front of the cutters 129 on the shafts 124 and 126, is mounted a circular saw 171, which is used for the purpose of trimming the inner edges of the strips 34ª before said edges are passed to the said cutters. Transversely journaled on the rails 32 and 33 at the rear of the marking-rollers is a shaft 172, on which is mounted a number of rollers 173 to impinge the upper surface of the upper board 34, and transversely journaled directly beneath the shaft 172 is another shaft 174, on which is mounted a number of rollers 175 to rest against the lower surface of the lower board 34, thus holding the upper and lower boards together and properly presenting them to the saws on the shafts 115 and 120, so that said boards may be formed with kerfs 176 in order that the slits 177 for the strips 178 may be formed.

From the foregoing and by reference to the drawings it will be clearly understood and readily seen that by employing a machine constructed according to my present invention two boards may be simultaneously marked or laid off with patterns so that the keys may be produced and properly bored and that in said operation the edges of certain parts of the boards will be treated or finished, thus greatly increasing the capacity of the machine and reducing the amount of manual labor required in the manufacture of keys for pianos and the like. It will be understood that the peripheral reduction on the marking and feed rollers is very slight and that the difference in the distance traveled by the enlarged portions and reduced portions of said rollers is so small that it will not affect the operation of the machine; but of course it will be necessary to place the marking devices on the reduced portions a little closer together in transverse rows than those in the transverse rows on the enlarged parts of said rollers. However, this will not be discernible to the naked eye, for in practice the difference will only amount to about one-eightieth of an inch in the circumference of the rollers.

What I claim is—

1. In a machine of the character described, the combination with the main frame, of a pair of marking-rollers transversely journaled in parallelism, means to rotate said rollers, marking devices arranged on the periphery of each of the rollers in circumferential and transverse rows to form marks or indented patterns on boards to indicate where they are to be sawed and bored to form keys for a piano or organ, some of the transverse rows of the marking devices being arranged out of alinement with the other rows thereof, substantially as described.

2. In a machine of the character described, the combination with the main frame, of a series of antifriction-rollers vertically journaled on its side rails, a pair of feed-rollers transversely journaled, a pair of marking-rollers transversely journaled in parallelism, means to rotate said rollers, marking devices arranged on the periphery of each of the marking-rollers in circumferential and transverse rows to form marks or indented patterns on boards to indicate where they are to be sawed and bored to form keys for a piano or organ, some of the transverse rows of the marking devices being located out of alinement with the other transverse rows thereof, substantially as described.

3. In a machine of the character described, the combination with the main frame, of a series of antifriction-rollers vertically journaled on one of its side rails, a series of antifriction-rollers vertically journaled and adjustably mounted on the other side rail of the frame, a pair of marking-rollers transversely journaled in parallelism, means to rotate said rollers, marking devices arranged on the periphery of each of the rollers in circumferential and transverse rows to form marks or indented patterns on boards to indicate where they are to be sawed and bored to form keys for a piano or organ, some of the transverse rows of the marking devices being arranged out of alinement with the other rows thereof, substantially as described.

4. In a machine of the character described, the combination with the main frame, of a series of antifriction-rollers vertically journaled on one of its side rails, a series of antifriction-rollers vertically journaled and adjustably mounted on the other side rail of the frame, a pair of marking-rollers transversely journaled in parallelism, means to rotate said rollers, marking devices arranged on the periphery of each of the rollers in circumferential and transverse rows to form marks or indented patterns on boards to indicate where they are to be sawed and bored to form keys for a piano or organ, substantially as described.

5. In a machine of the character described, the combination with the main frame, of a pair of marking-rollers transversely journaled in parallelism, each of said rollers peripherally reduced from one of its ends inwardly, means to rotate said rollers, marking devices arranged on the periphery of each of the rollers in circumferential and transverse rows to form marks or indented patterns on boards to indicate where they are to be sawed and bored to form keys for a piano or organ, substantially as described.

6. In a machine of the character described, the combination with the main frame, of a pair of marking-rollers transversely journaled in parallelism, each of said rollers peripherally reduced from one of its ends inwardly, means to rotate said rollers, marking devices arranged on the periphery of each of the rollers in circumferential and transverse rows to form marks or indented patterns on boards to indicate where they are to be sawed and bored to form keys for a piano or organ, some of the transverse rows of the marking devices being arranged out of alinement with the other rows thereof, substantially as described.

7. In a machine of the character described, the combination with the main frame, of a series of antifriction-rollers vertically journaled on its side rails, a pair of feed-rollers transversely journaled on the main frame, a pair of marking-rollers transversely journaled in parallelism on the frame near the feed-rollers, each of the feed-rollers and each of the marking-rollers having peripherally-reduced portions extending from one of their ends inwardly, means to rotate all of said rollers, marking devices arranged on the periphery of each of the marking-rollers in circumferential and transverse rows to form marks or indented patterns on boards to indicate where they are to be sawed and bored to form keys for a piano or organ, substantially as described.

8. In a machine of the character described, the combination with the main frame, of a series of antifriction-rollers vertically journaled on its side rails, a pair of feed-rollers transversely journaled on the main frame, a pair of marking-rollers transversely journaled in parallelism on the frame near the feed-rollers, each of the feed-rollers and each of the marking-rollers having peripherally-reduced portions extending from one of their ends inwardly, means to rotate all of said rollers, marking devices arranged on the periphery of each of the marking-rollers in circumferential and transverse rows to form marks or indented patterns on boards to indicate where they are to be sawed and bored to form keys for a piano or organ, some of the transverse rows of the marking devices being located out of alinement with the other transverse rows thereof, substantially as described.

9. In a machine of the character described, the combination with the main frame, of a pair of marking-rollers transversely journaled thereon in parallelism, means to rotate said rollers, marking devices arranged on the periphery of each of the rollers in circumferential and transverse rows to form marks or indented patterns on boards to indicate where they are to be sawed and bored to form keys for a piano or organ, a shaft transversely journaled on the main frame at the rear of the marking-rollers, a pair of circular saws mounted in parallelism on said shaft to form longitudinal slits in one of the boards, substantially as described.

10. In a machine of the character described, the combination with the main frame, of a pair of marking-rollers transversely journaled thereon in parallelism, marking devices arranged on the periphery of each of the rollers in circumferential and transverse rows, two shafts transversely journaled one above the other on the frame at the rear of the marking-rollers, a pair of circular saws mounted in parallelism on each of said shafts to form longitudinal slits in the boards, substantially as described.

11. In a machine of the character described, the combination with the main frame, of a pair of marking-rollers transversely journaled thereon, each of said rollers peripherally reduced from one of its ends inwardly, marking devices arranged on the periphery of each of the rollers in circumferential and transverse rows, a shaft transversely journaled on the main frame at the rear of the marking-rollers, and a circular cutter mounted on said shaft at a point in the rear of the inner portion of the reduced part of one of the marking-rollers, substantially as described.

12. In a machine of the character described, the combination with the main frame, of a pair of marking-rollers transversely journaled thereon, each of said rollers peripherally reduced from one of its ends inwardly, marking devices arranged on the periphery of each of the rollers in circumferential and transverse rows, two shafts transversely journaled one above the other on the main frame at the rear of the marking-rollers, and a circular cutter mounted on each of said shafts at a point in the rear of the inner portion of the reduced parts of the marking-rollers, substantially as described.

13. In a machine of the character described, the combination with the main frame, of a pair of marking-rollers transversely journaled thereon in parallelism, each of said rollers peripherally reduced from one of its ends inwardly, marking devices arranged on the periphery of each of the rollers in circumferential and transverse rows, two shafts transversely journaled one above the other on the main frame at the rear of the marking-rollers, a circular cutter mounted on each of said shafts near one of its ends, two other shafts transversely journaled one above the other on the main frame between the first-named shafts and the marking-rollers, and a circular saw mounted on each of said shafts directly in front of said circular cutters, substantially as described.

14. In a machine of the character described, the combination with the main frame, of a pair of feed-rollers transversely journaled on the main frame, a pair of marking-rollers transversely journaled in parallelism on the frame near the feed-rollers, marking devices arranged on the periphery of each of the marking-rollers in circumferential and transverse rows to form marks or indented patterns on boards to indicate where they are to be sawed and bored to form keys for a piano or organ, and means on the main frame to raise and lower the upper feed and marking rollers, substantially as described.

15. In a machine of the character described, the combination with the main frame, of a pair of feed-rollers transversely journaled thereon, a pair of marking-rollers transversely journaled on the frame near the feed-rollers, each of the feed-rollers and each of the marking-rollers having peripherally-reduced portions extending from one of their ends inwardly, marking devices arranged on the periphery of each of the marking-rollers in circumferential and transverse rows to form marks or indented patterns on boards, and means on the main frame to raise and lower the upper feed and marking rollers, substantially as described.

16. In a machine of the character described, the combination with a main frame having two stationary side rails, of a rail movably and longitudinally mounted on each of said side rails, a screw-rod vertically located at each end of each of the movable rails and engaging the same as well as the stationary side rails, a beveled gear on the upper end of each of said rods, a shaft transversely and horizontally journaled at each end of the main frame, a beveled gear on each end of each of said shafts to mesh with the gears on the screw-rods, a shaft longitudinally journaled on one side of the main frame, a beveled gear mounted on said shaft near each of its ends to engage the gears on the screw-rods on one side of the frame, and means to turn the last-named shaft, substantially as described.

17. In a machine of the character described, the combination with a main frame having two stationary side rails, of a rail movably and longitudinally mounted on each of said side rails, a screw-rod vertically located at each end of each of the movable rails and engaging the same as well as the stationary side rails, a beveled gear on the upper end of each of said rods, a shaft transversely and horizontally journaled at each end of the main frame, a beveled gear on each end of each of said shafts to mesh with the gears on the screw-rods, a shaft longitudinally journaled on one side of the main frame, a beveled gear mounted on said shaft near each of its ends to engage the gears on the screw-rods on one side of the frame, means to turn the last-named shaft, a lower marking-roller transversely journaled on the stationary part of the main frame, an upper marking-roller transversely journaled on the movable rails, marking devices arranged on the periphery of each of the marking-rollers in circumferential and transverse rows to form marks or indented patterns on boards, substantially as described.

18. In a machine of the character described, the combination with a main frame having two stationary side rails, of a rail movably and longitudinally mounted on each of said side rails, a screw-rod vertically located at each end of each of the movable rails and engaging the same as well as the stationary side rails, a beveled gear on the upper end of each of said rods, a shaft transversely and horizontally journaled at each end of the main frame, a beveled gear on each end of each of said shafts to mesh with the gears on the screw-rods, a shaft longitudinally journaled on one side of the main frame, a beveled gear mounted on said shaft near each of its ends to engage the gears on the screw-rods on one side of the frame, means to turn the last-named shaft, a lower feed-roller transversely journaled on the stationary part of the frame, an upper feed-roller transversely journaled on the movable rails above said lower roller, a lower marking-roller transversely journaled on the stationary part of the frame, an upper marking-roller transversely journaled on the movable rails above the lower marking-roller, each of the feed-rollers and each of the marking-rollers having peripherally-reduced portions extending from one of their ends inwardly, marking devices arranged on the periphery of each of the marking-rollers in circumferential and transverse rows to form marks or indented patterns on boards, substantially as described.

19. In a machine of the character described, the combination with a main frame having two stationary side rails, of a rail movably and longitudinally mounted on each of said side rails, a screw-rod vertically located at each end of each of the movable rails and engaging the same as well as the stationary side rails, a beveled gear on the upper end of each of said rods, a shaft transversely and horizontally journaled at each end of the main frame, a beveled gear on each end of each of said shafts to mesh with the gears on the screw-rods, a shaft longitudinally journaled on one side of the main frame, a beveled gear mounted on said shaft near each of its ends to engage the gears on the screw-rods on one side of the frame, means to turn the last-named shaft, a lower feed-roller transversely journaled on the stationary part of the frame, an upper feed-roller transversely journaled on the movable rails above said lower roller, a lower marking-roller transversely journaled on the stationary part of the frame, an upper marking-roller transversely journaled on the movable rails above the lower marking-roller, each of the feed-rollers and each of the marking-rollers having peripherally-reduced portions extending from one of their ends inwardly, marking devices arranged on the periphery of each of the marking-rollers in circumferential and transverse rows to form marks or indented patterns on boards, two shafts transversely journaled one above the other on the frame at the rear of the marking-rollers, one of said shafts being journaled on the stationary part of the frame and the other on the movable rails thereof, and a circular cutter mounted on each of said shafts near one of its ends, substantially as described.

20. In a machine of the character described, the combination with the main frame, of a pair of marking-rollers transversely journaled thereon in parallelism, means to rotate said rollers, a band rigidly secured on the periphery of each of the rollers at one of its ends and having marking devices arranged thereon in circumferential and transverse rows, a series of bars located transversely on the periphery of each of the rollers and adjustably secured thereon, each of said bars having a series of pointed pins at one of its edges, and a pointed pin adjustably secured to each of said bars at about its middle, substantially as described.

21. In a machine of the character described, the combination with the main frame, of a pair of marking-rollers transversely journaled thereon one above the other, each of said rollers peripherally reduced from one of its ends inwardly, a band rigidly secured on the periphery of each of the rollers at one of its ends and having marking devices arranged thereon in circumferential and transverse rows, a series of bars located transversely on the periphery of each of the rollers and adjustably secured thereon, each of said bars having a series of pointed pins at one of its edges, and a pointed pin adjustably secured to each of said bars at about its middle, substantially as described.

22. In a machine of the character described, the combination with the main frame, of a pair of marking-rollers transversely journaled thereon one above the other, each of said rollers peripherally reduced from one of its ends inwardly, a band rigidly secured on the periphery of each of the rollers at one of its ends and having marking devices arranged thereon in circumferential and transverse rows, a series of bars located transversely on the periphery of the enlarged part of each of the rollers and adjustably secured thereon, each of said bars having a series of pointed pins at one of its edges, and a pointed pin adjustably secured to each of said bars at about its middle, substantially as described.

23. In a machine of the character described, the combination with the main frame, of a pair of marking-rollers transversely journaled thereon one above the other, each of said rollers peripherally reduced from one of its ends inwardly, a band rigidly secured on the periphery of each of the rollers at its enlarged end and having marking devices arranged thereon in circumferential and transverse rows, a series of bars located transversely on the peripherally-enlarged portion of each of the rollers and adjustably secured thereon, each of said bars having a series of pointed pins at one of its edges and a pointed pin adjustably secured to each of said bars at about its middle, a series of bars transversely and adjustably mounted on the peripherally-reduced portion of each of said rollers, each of the last-named bars having a series of pointed pins as one of their edges, substantially as described.

24. In a machine of the character described, the combination with the main frame, of a pair of feed-rollers transversely journaled thereon one above the other, a pair of marking-rollers transversely journaled on the frame one above the other, each of the feed-rollers and each of the marking-rollers peripherally reduced from one of its ends inwardly, a band rigidly secured on the periphery of each of the marking-rollers at its enlarged end and having marking devices arranged thereon in circumferential and transverse rows, a series of bars located transversely on the periphery of each of the marking-rollers and adjustably secured thereon, each of said bars having a series of pointed pins at one of its edges, and a pointed pin adjustably secured to each of said bars at about its middle, substantially as described.

25. In a machine of the character described, the combination with the main frame, of a pair of feed-rollers transversely journaled thereon one above the other, a pair of marking-rollers transversely journaled on the frame one above the other, each of the feed-rollers and each of the marking-rollers peripherally reduced from one of its ends inwardly, a band rigidly secured on the periphery of each of the marking-rollers at its enlarged end and having marking devices arranged thereon in circumferential and transverse rows, a series of bars located transversely on the peripherally-enlarged portion of each of the marking-rollers and adjustably secured thereon, each of said bars having a series of pointed pins at one of its edges and a pointed pin adjustably secured to each of said bars at about its middle, another series of bars located transversely on the peripherally-reduced portion of each of the marking-rollers and adjustably secured thereon, each of the last-named bars having a series of pointed pins at one of its edges, substantially as described.

26. In a machine of the character described, the combination with the main frame, of a pair of marking-rollers transversely journaled thereon one above the other, each of said rollers peripherally reduced from one of its ends inwardly, marking devices arranged on the periphery of each of the rollers in circumferential and transverse rows, two pairs of circular saws journaled in parallelism one pair above the other on the main frame at the rear of the marking-rollers, and means to hold the boards against said saws, substantially as described.

PHILIP SCHNEIDER.

Witnesses:
MINA HAGBERG,
EMANUEL LUNDQUIST.